United States Patent [19]
Fukuyama et al.

[11] 4,370,704
[45] Jan. 25, 1983

[54] FEED SPEED CONTROL SYSTEM

[75] Inventors: Hiroomi Fukuyama, Hachioji; Shinichi Isobe, Tachikawa, both of Japan

[73] Assignee: Fujitsu Fanuc Limited, Tokyo, Japan

[21] Appl. No.: 183,036

[22] Filed: Sep. 2, 1980

[30] Foreign Application Priority Data

Sep. 4, 1979 [JP] Japan .................................. 54-113261

[51] Int. Cl.³ .............................................. G05B 19/18
[52] U.S. Cl. .................................... 364/171; 318/571; 364/474
[58] Field of Search ........................ 364/474, 475, 171; 318/571, 572, 569, 570

[56] References Cited
U.S. PATENT DOCUMENTS

| | | | |
|---|---|---|---|
| 3,970,830 | 7/1976 | White et al. ..................... | 364/474 X |
| 4,074,349 | 2/1978 | Ueda ............................... | 364/474 X |
| 4,115,858 | 9/1978 | Kaufman ........................... | 364/474 |
| 4,135,239 | 1/1979 | Hamill et al. ..................... | 364/474 X |
| 4,199,814 | 4/1980 | Rapp et al. ...................... | 364/474 |
| 4,209,847 | 6/1980 | Noda et al. ..................... | 364/474 X |

*Primary Examiner*—Joseph F. Ruggiero
*Attorney, Agent, or Firm*—Staas & Halsey

[57] ABSTRACT

A feed speed control system for use in numerical control systems or the like, in which a set feed speed can be adjusted through a simple structure. The control system includes a memory circuit for storing a plurality of numerical values corresponding to feed speeds, a command circuit for issuing a command indicative of a prescribed numerical value from among the plurality of numerical values, an arithmetic circuit for incrementing or decrementing a numerical value read from the memory circuit in response to an output pulse from manual operation device, and a pulse generating circuit for generating pulses of a frequency which is proportional to an incremented or decremented numerical value from the arithmetic circuit.

19 Claims, 4 Drawing Figures

FEED SPEED CONTROL SYSTEM

BACKGROUND OF THE INVENTION

This invention relates to a system for controlling the feed speed of a movable member in numerical control equipment or the like.

In numerically controlled machining, the optimum feed speed of a movable member, for example, the workpiece table, is decided by taking into account such factors as the life of the cutter and the machining time. If the machining or feed speed is increased without considering the optimum feed speed in an effort to shorten the machining time, the cutter is subjected to an excessive load and is likely to sustain such damage as snapping or chipping. On the other hand, if the machining speed is decreased below the optimum speed in order to prolong the life of the cutter, the numerically controlled machining operation cannot be performed efficiently because of the excessive increase in machining time. In general, the optimum machining speed is determined by considering a variety of factors such as the hardness of the workpiece, the amount of the workpiece which is to be removed by cutting, the sharpness and flexibility of the cutter and the rigidity of the machine. However, once the optimum machining speed has been determined and punched in the command tape and the machine actually placed in operation, it is often found that the machine should be run at a speed slightly lower than the optimum speed to preclude cutter damage, or at a slightly higher speed to reduce machining time. Hence it is required that a manual adjustment be made to the feed speed of the movable member, which is actually being operated by the command type, to adjust the feed speed to the true optimum feed speed.

With the conventional feed speed control system of the type described, however, the manual adjustment of the speed is carried out by manipulating a number of speed command dials, the dials in turn operating in association with corresponding oscillators. The plurality of dials and oscillators which are necessary in the prior art represent a large number of component parts and, since the space required to mount them is limited, it is difficult to construct the apparatus inexpensively and compactly. Moreover, the existence of a plurality of dials makes manual adjustment a complicated matter so that the operator must exercise caution in manipulating the dials.

Accordingly, there is a demand for a feed speed control system which does not require a large number of dials and the associated peripheral equipment.

SUMMARY OF THE INVENTION

The present invention is directed to a feed speed control system having a small number of parts and requiring only a small amount of space for mounting.

Accordingly, it is an object of the present invention to provide a novel and simply constructed feed speed control system which has a small number of parts and which may be mounted in a small mounting space.

It is another object of the present invention to provide a feed speed control system in which manual adjustment of feed speed can be achieved by manipulating a small number of command buttons.

It is still another object of the present invention to provide a digitally operable feed speed control system.

It is a further object of the present invention to provide a feed speed control system which can be inexpensively constructed.

Other features and advantages of the invention will be apparent from the following description taken in connection with the accompanying drawings wherein like numerals refer to like parts throughout.

DESCRIPTION OF THE PREFERRED EMBODIMENTS

Figure 1:
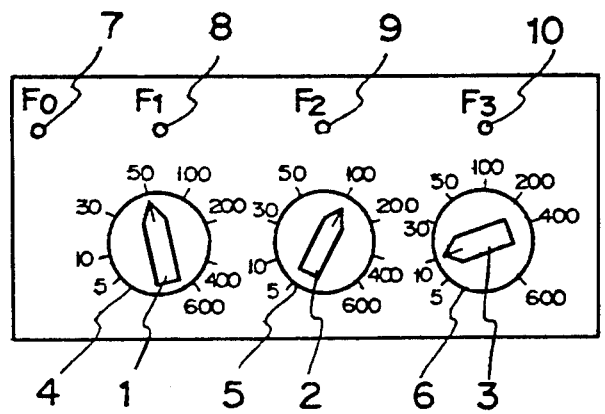
FIG. 1 is a front view showing the operation panel of a prior art feed speed control system.
Figure 2:
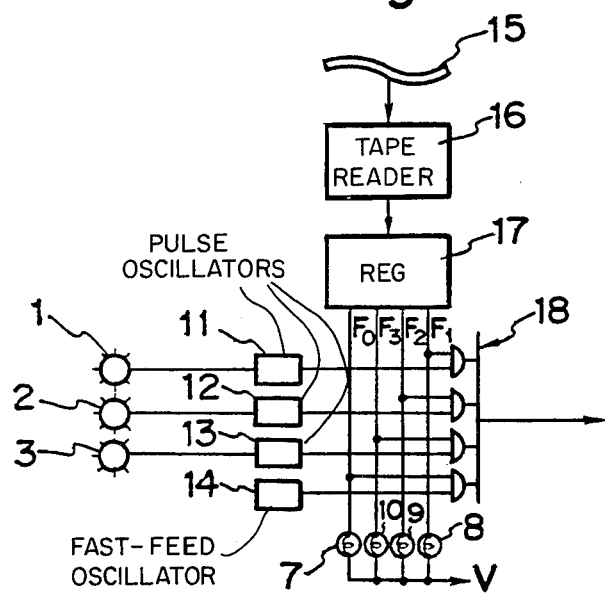
FIG. 2 is a prior art block diagram of a feed speed control system.

Reference will first be had to FIGS. 1 and 2 which illustrate a conventional feed speed control system and which are useful for an understanding of the difference between the prior art and the present invention. The operation panel of the conventional system, as shown in FIG. 1, includes a plurality of dials 1, 2, 3 for setting feed speed. Prescribed ones of the dials corresponding to commands F1, F2, F3, which have been punched in a command tape for a machining operation, are designated by the commands, the designated dial being turned by the operator during the actual machining operation to set the optimum feed speed. In addition to the commands F1, F2, F3, a fast-feed command Fo has also been punched in the command tape. The operation panel of FIG. 1 further includes feed speed scales 4, 5, 6 for respective ones of the feed speed setting dials 1, 2, 3, as well as lamps 7, 8, 9 and 10 above which the panel is marked F0, F1, F2 and F3. Whenever the command tape supplies one of the commands F0, F1, F2 or F3, the lamp identified by the corresponding command will light up.

The above-described feed speed control system, which is illustrated by the block diagram of FIG. 2, further includes a plurality of pulse oscillators 11, 12, 13 for generating pulses at frequencies which correspond to values designated by the dials 1, 2, 3, respectively; a fast-feed oscillator 14; a tape 15 for designating which of the output pulse trains from the oscillators 11, 12, 13, 14 is to be selected; a tape reader 16; a register 17 for storing the commands F0, F1, F2, F3 punched in the tape 15; and a gate group 18 for selecting an output pulse train from a prescribed pulse oscillator on the basis of the speed command stored in the register 17. The lamps 8, 9, 10 are those described in connection with FIG. 1.

In accordance with the above arrangement, the dial designated by the feed speed command from the tape is turned by the operator to enable the setting of the optimum feed speed conforming to the machining conditions. The conventional system is therefore effective in establishing the optimum feed speed. However, a disadvantage is encountered due to the need for the plurality of dials 1, 2, 3, provided for the commands F1, F2, F3, respectively, and the need for the oscillators 11, 12, 13, 14. These components raise the cost of the apparatus considerably, and require a fairly large mounting area, so that the apparatus cannot be made compact. The increase in the number of component parts and in the size of the mounting area is especially great in numerical control systems that adopt the foregoing feed speed command arrangement, because as many as 9 dials are commonly provided in view of the fact that a greater number of dials facilitates more flexible programming.

The feed speed control system of the present invention is free of the above-mentioned problems and will now be described with reference to the block diagram of FIG. 3. Numeral 101 denotes a paper tape, into which a machining program has been punched, and which serves as a medium for storing feed speed commands, the feed speed being designated by the feed speed commands F0, F1, . . . F9 which have been punched in the tape. A tape reader 102 reads the tape 101 and delivers the data to an input circuit 103 which includes a buffer memory or the like to store the data such as the feed speed command read in from the paper tape. The paper tape 101, tape reader 102 and input circuit 103 constitute speed command means. A memory 104 stores numerical values corresponding to, for example, the feed speed commands F1, F2, . . . F9. Coupled to the memory 104 are a write control circuit 105, a read control circuit 106 and an address register 107. Set in the address register 107 are addresses in accordance with the feed speed commands F1, F2, . . . , F9 from the paper tape 101. Numerical values $Nf_1$, $Nf_2$, . . . , $Nf_9$ corresponding to the commands F1, F2 . . . , F9 are read, through the intermediary of the read control circuit 106, from the locations of the memory 104 that are designated by the addresses. In addition, through the intermediary of the write control circuit 105, the results of arithmetical operations, based on an addition and substraction process to be described later, are written in the locations of the memory 104 that are designated by the address register. The memory 104, write control circuit 105, read control circuit 106, and address register 107 constitute memory means. An output register 108 stores the numerical values which are read from the memory 104.

An arithmetic circuit 109 is adapted to increment or decrement the content of the output register 108 by a unit quantity, such as the numerical value "2", whenever an up-pulse UPP or down-pulse DWP is generated by depressing an UP-button or DOWN-button located on an operation panel (not shown). The arithmetic circuit 109 per se may be of any construction which is known in the art. The result of the arithmetical operation is applied to the output register 108 and to a digital pulse generator 110 which will be described immediately hereinbelow. The output register 108 and arithmetic circuit 109 constitute arithmetic means.

The digital pulse generator 110 includes a register 110a, an accumulator 110b, and an adder 110c which is clocked by clock pulses CP at a frequency F to add the contents of the register 110a and accumulator 110b and to place the result back in the accumulator 110b. Let A represent the numerical value set in the register 110a, and let $2^n - 1$ represent the capacity of the accumulator 110b, the accumulator being an n-bit register. As the adder 110c performs the addition operation described above each time a clock pulse CP arrives, the accumulator 110b delivers an overflow pulse signal OVFP whose frequency Fo will be expressed by $Fo = A \cdot F/(2^n - 1)$. In other words, the accumulator 110b generates an overflow pulse signal OVFP of a frequency which is proportional to the numerical value which has been set in the register 110a. The signal OVFP is applied to drive the movable member, such as the workpiece table, of the machine tool.

In operation, let it first be assumed that the tape reader 102 has read in the feed speed command F3 from the paper tape 101. The input circuit 103 converts the feed speed command F3 into the address in the memory 4 that stores the numerical value $Nf_3$ corresponding to the command F3, and then sets this address in the address register 107. The read control circuit 106 reads the numerical value $Nf_3$ from the location of the memory 104 which has been designated by the address set in the address register 107, and sets this numerical value in the output register 108. The numerical value $Nf_3$ is then set in the register 110a of the pulse generator 110 through the arithmetic circuit 109. As a result, the pulse generator 110 delivers the overflow pulse signal OVFP, having a frequency proportional to $Nf_3$, in the manner described above. This signal is applied to a well-known pulse distributor (not shown) that responds by generating and distributing pulses, which are proportional in number to the frequency of the signal OVFP, for driving such movable members as tools and the workpiece table on the basis of these distributed pulses.

If it is desired that the feed speed of a movable member be changed during an actual machining operation, then an UP- or DOWN-button on the operation panel (not shown) is depressed. More specifically, the UP-button is depressed when it is desired to raise the feed speed, and the DOWN-button is depressed when it is desired to lower the feed speed. If the UP-button is depressed, up-pulses UPP of a prescribed frequency will be generated for as long as the UP-button is held depressed, and the pulses will be applied to the arithmetic circuit 109. Each time a pulse UPP arrives, the arithmetic circuit 109 adds a fixed quantity, such as the numerical value "2", to the numerical value $Nf_3$ stored in the output register 108, places the sum in the output register 108, and sets the sum in the register 110a. Therefore the content of the register 110a gradually increases, as does the frequency of the overflow pulses OVFP delivered by the pulse generator 110. The arithmetic circuit 109 stops performing the arithmetical operation when the operator removes his finger from the UP-button, so that the output pulse frequency of the pulse generator 110 is fixed at the higher frequency. Hence the feed speed of the movable member is also fixed at the new constant speed. The numerical value stored in the output register 108 is placed in that location of the memory 104 corresponding to the feed speed command F3 through the write control circuit 105, this occurring when the UP-button is released, or in response to a signal indicating the termination of the pulse distribution operation or the like.

If the DOWN-button is depressed, the down-pulses DWP are generated. Each time a pulse DWP arrives the arithmetic circuit 109 subtracts a fixed quantity stepwise from the numerical value $Nf_3$ stored in the output register 108, places the difference in the output register 108, and sets the difference in the register 110a. The content of the register 110a is gradually reduced thereby, as is the frequency of the pulses from the pulse generator 110.

Although the arithmetic circuit 109 described above increments or decrements the numerical value which corresponds to the particular feed speed command by fixed values whenever an up- or down-pulse arrives, it is also possible to increase or decrease the numerical value geometrically by means of a suitable arrangement.

Moreover, though the foregoing description relates to an arrangement in which the up-pulses UPP and down-pulses DWP are generated by depressing UP- and DOWN-buttons located on the operation panel, these buttons can be eliminated and in their stead it is possible to make use of a manual feed jog button and a manual pulse generator or the like which are already provided on the operation panel of the numerical control apparatus. Such an expedient permits an even greater reduction in the number of component parts.

Figure 3:
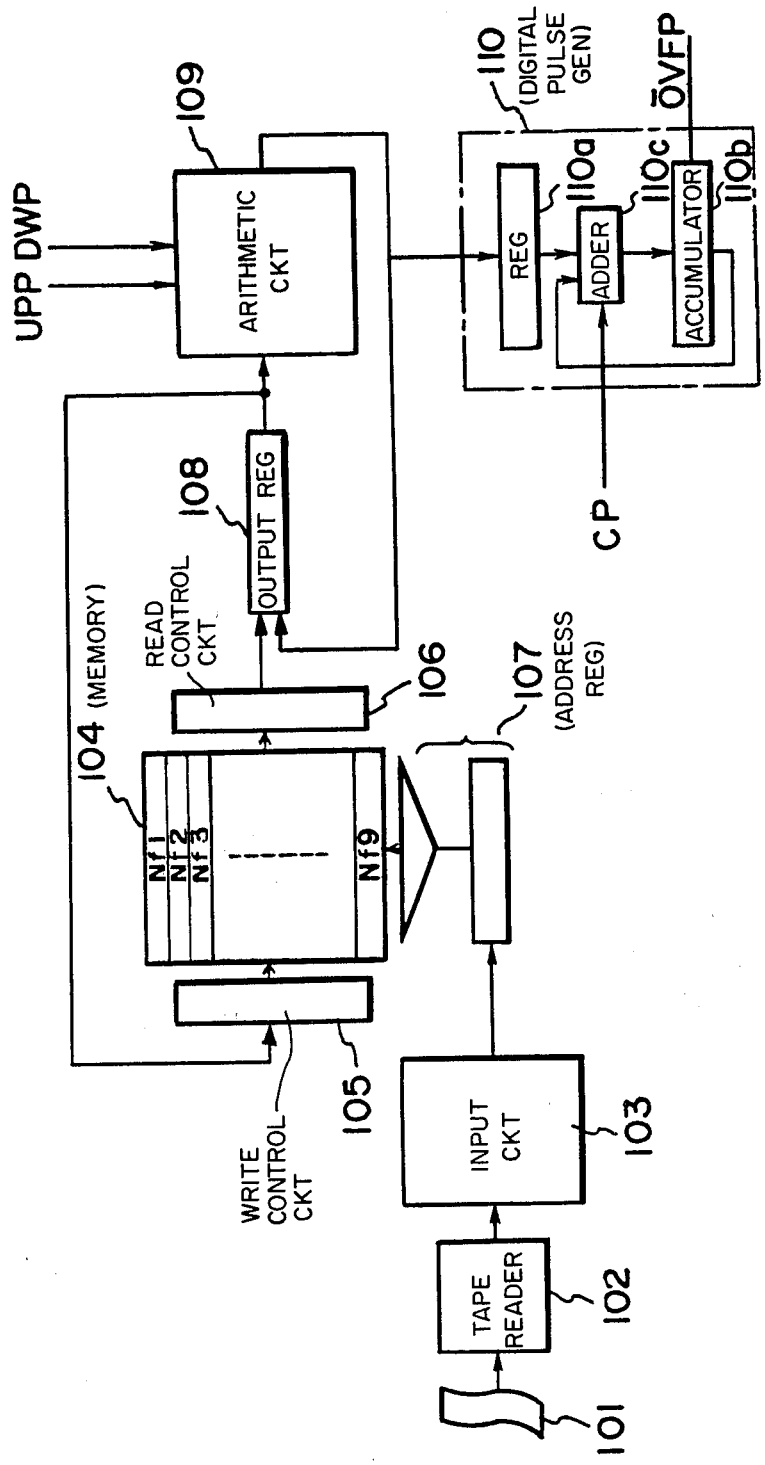
FIG. 3 is a block diagram of an embodiment of a feed speed control system according to the present invention.
Figure 4:
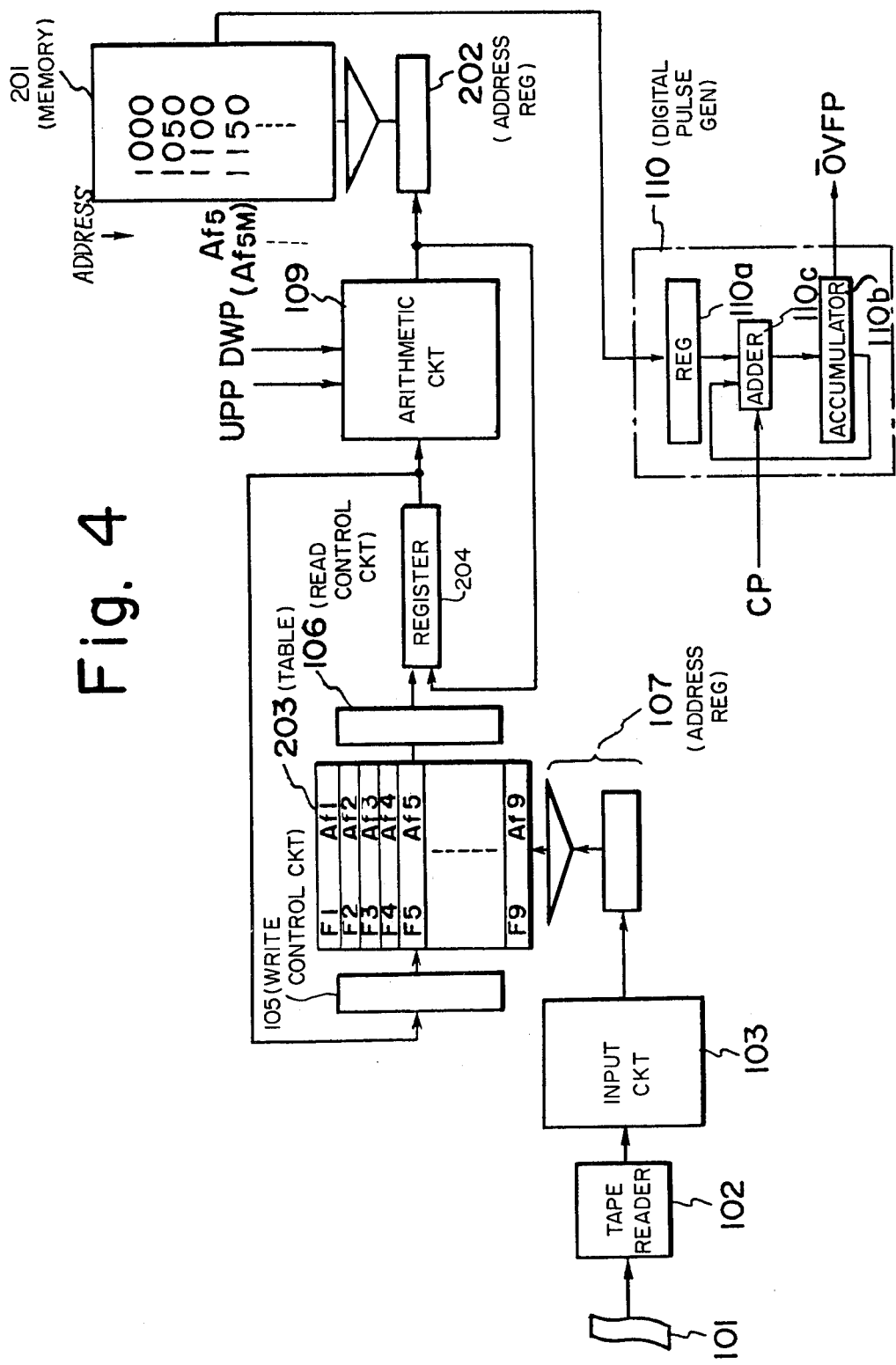
FIG. 4 is a block diagram which is useful in describing another embodiment of the present invention.

Another embodiment of the present invention is illustrated in the block diagram of FIG. 4, in which component parts identical to those of FIG. 3 bear the same reference numerals and which are not described in detail again in order to avoid prolixity. In FIG. 4, numeral 201 denotes a conversion memory for storing numerical values which correspond to a number of feed speeds. Numerical values are stored in respective locations of the memory 201 in such a manner that the numerical values become progressively larger as the addresses of these locations increase in value. The arrangement further includes an address register 202, a table 203 for storing the corresponding relationships between speed commands F1, F2, . . . , F9 on the one hand and addresses Af1, Af2, . . . , Af9 on the other, and a register 204 for storing addresses read from the table 203.

In operation, let it be assumed that the feed speed command F5 has been read from the paper tape, so that the address Af5 corresponding to the command F5 is read from the table 203 and transferred to the register 204 and the address register 202. When Af5 is transferred to the address register 202, a numerical value such as "1100" corresponding to the feed speed is read from the address Af5 of memory 201 and then set in the register 110a of the pulse generator 110. As a result, the pulse generator 110 generates pulses OVFP of a frequency which is proportional to the numerical value "1100". Depressing the UP-button under these conditions generates the up-pulses UPP. When an up-pulse UPP, arrives, the arithmetic circuit 109 increments the content of the register 204 by +1, and applies the sum to the register 204 and to the address register 202. As a result, the content of the address register 202 is increased by +1, the numerical value "1150" is read from the location having the address Af5+1, and the numerical value is set in the register 110a. Since the numerical value "1150" is larger than the numerical value "1100" stored at the address Af5, there is a gradual increase in the frequency of the pulse signal from the pulse generator 110. Thus, if the UP-button continues to be depressed to permit continuous generation of the up-pulses UPP, there is a gradual increase in the numerical value set in the register 110a, and a corresponding gradual increase in the frequency of the output pulses OVFP, thereby raising the feed speed of a movable member. Then, in response to release of the UP-button or, for example in response to termination of the pulse distribution operation, the address which is stored in register 204 is placed in the table 203 as the new address Af5, thereby completing the feed speed adjustment operation. It should be noted that the operation proceeds in virtually the same manner if the DOWN-button is depressed.

In the above-mentioned embodiments each of the functions is realized through hardware but no analog elements are used. Hence the apparatus can be realized through the use of a processor such as a microprocessor.

In accordance with the present invention as described above only one set of elements such as push-buttons and only one pulse generator need be provided for common use with a number of feed commands, rather than having a set for each individual feed speed command. This reduces the number of parts and greatly simplifies the overall structure, reduces the space occupied by the parts, and lowers the cost. An even greater reduction in space and cost can be achieved if, instead of the push-buttons, use is made of job buttons and a manual pulse generator which are already mounted on the NC operation panel. Furthermore, additional structural components will not be necessary if a processor with a bult-in NC apparatus is made to execute the above described speed command processes.

As many apparently widely different embodiments of the present invention can be made without departing from the spirit and scope thereof, it is to be understood that the invention is not limited to the specific embodiments thereof except as defined in the appended claims.

What we claim is:

1. A feed speed control system for controlling the feed speed of a movable member, comprising:
    memory means for storing a plurality of numerical values corresponding to feed speeds;
    command means, operatively connected to said memory means, for issuing a command signal indicative of a selected numerical value from among the plurality of numerical values stored in said memory means;
    manual operation means for providing an adjustment pulse;
    arithmetic means, operatively connected to said memory means, for reading the selected numerical value from said memory means and for incrementing or decrementing the selected numerical value read from said memory means in response to the adjustment pulse from said manual operation means; and
    pulse generating means, operatively connected to said arithmetic means, for generating output pulses of a frequency which is proportional to the incremented or decremented selected numerical value from said arithmetic means, the frequency of said output pulses corresponding to the feed speed.

2. A feed speed control system as set forth in claim 1, wherein said arithmetic means increments or decrements said selected numerical value stepwise by unit values whenever said manual operation means issues the adjustment pulse.

3. A feed speed control system as set forth in claim 1, wherein the incremented or decremented selected numerical value provided by said arithmetic means is stored in said memory means.

4. A feed speed control system as set forth in claim 1, wherein said manual operation means produces up-pulses and down-pulses, said arithmetic means responding to an up-pulse to increment said selected numerical value and responding to a down-pulse to decrement said selected numerical value.

5. A feed speed control system as set forth in claim 1, wherein said command means comprises input means for entering machining data pertaining to a workpiece, and wherein the output pulses from said pulse generating means are employed to control the feed speed of the movable member which is adapted to machine the workpiece.

6. A feed speed control system as set forth in claim 1, wherein said command means comprises storage means for storing feed speed commands, and read means for reading the feed speed commands from said storage means.

7. A feed speed control system as set forth in claim 1, wherein said arithmetic means comprises a register, connected to said memory means, for storing the selected numerical value and an arithmetic circuit connected to said register.

8. A feed speed control system as set forth in claim 7, wherein said arithmetic means further comprises a conversion memory operatively connected between said arithmetic circuit and said pulse generating means, which is addressed by an output from said arithmetic circuit, for storing numerical values corresponding to a plurality of feed speeds.

9. A feed speed control system as set forth in claim 1, wherein said pulse generating means comprises;
means for providing clock pulses; a register connected to said arithmetic means; an accumulator; and
an adder, connected to said means for providing clock pulses, said register and said accumulator, for adding the contents of said register and said accumulator whenever one of the clock pulses is received, and for placing the result of the addition operation in said accumulator;
the output pulse generated by said pulses generating means being an overflow output from said accumulator.

10. A feed speed control system as set forth in claim 9, wherein the output pulses have a frequency Fo which is determined by the frequency F of the clock pulses, a numerical value A which has been set in said register, and the capacity $2^n - 1$ of said accumulator, where n is the number of bits in said accumulator.

11. A feed speed control system as set forth in claim 1, wherein said command means comprises:
storage means for storing feed speed commands; and
read means, connected to said memory means, for reading the feed speed commands from said storage means;
wherein said arithmetic means includes:
a first register connected to said memory means; and
an arithmetic circuit connected to said first register; and
wherein said pulse generating means includes:
means for providing clock pulses;
a second register connected to said arithmetic circuit;
an accumulator; and
an adder, connected to said means for providing clock pulses, said second register and said accumulator, for adding the contents of said second register and said accumulator whenever one of the clock pulses is received, and for placing the result of the addition operation in said accumulator.

12. A feed speed control system as set forth in claim 1, wherein said command means includes:
storage means for storing feed speed commands; and
read means, connected to said memory means, for reading the feed speed commands from said storage means;
wherein said arithmetic means includes:
a first register connected to said memory means;
an arithmetic circuit connected to said first register; and
a conversion memory, which is addressed by an output from said arithmetic circuit, for storing numerical values corresponding to a plurality of feed speeds;
and wherein said pulse generating means includes:
means for providing clock pulses;
a second register connected to said conversion memory;
an accumulator; and
an adder, connected to said means for providing clock pulses, said second register, and said accumulator, for adding the contents of said second register and said accumulator whenever one of the clock pulses is received, and for placing the result of the addition operation in said accumulator.

13. A feed speed control system as set forth in claim 1, wherein said arithmetic means increments or decrements said selected numerical value stepwise geometrically whenever said manual operation means issues the adjustment pulse.

14. A feed speed control system for controlling the feed speed of a movable member, comprising:
speed command means for generating a command signal indicative of a selected feed speed;
memory means for storing a plurality of numerical values corresponding to feed speeds and for providing, as an output, a selected numerical value, among the plurality of numerical values, in dependence upon said command signal;
manual operation means for providing an adjustment pulses;
arithmetic means, operatively connected to said memory means and said manual operation means, for incrementally changing the selected numerical value provided by said memory means in response to the adjustment pulse from said manual operation means; and
pulse generating means, operatively connected to said arithmetic means, for generating output pulses of a frequency which is proportional to the incrementally changed selected numerical value from said arithmetic means, the frequency of said output pulses corresponding to the feed speed.

15. A feed speed control system as set forth in claim 14 wherein said pulse generating means comprises:
means for providing clock pulses;
a register, connected to said arithmetic means, for receiving said incrementally changed selected numerical value;
an accumulator; and
an adder, operatively connected to said means for providing clock pulses, said register and said accumulator, for adding the contents of said register and said accumulator when one of the clock pulses is received, and for placing the result of the addition operation in said accumulator;
said accumulator providing said output pulses in the form of an overflow output.

16. A feed speed control system as set forth in claim 14 or 15, wherein said arithmetic means comprises:
an output register, connected to said memory means, for receiving the selected numerical value; and
an arithmetic circuit, connected to said output register, said manual operation means, and said pulse generating means, for incrementally changing the content of said output register in dependence upon the adjustment pulse from said manual operation means, and for providing, as an output, said incrementally changed selected numerical value.

17. A feed speed control system for controlling the feed speed of a movable member, comprising:
speed command means for generating a command signal indicative of a selected feed speed;
memory means for storing a plurality of addresses corresponding to feed speeds and for providing, as an output, a selected address, among the plurality of addresses, in dependence upon said command signal;
manual operation means for providing an adjustment pulse;
arithmetic means, operatively connected to said memory means and said manual operation means, for incrementally changing the selected address provided by said memory means in response to the adjustment pulse from said manual operation means, for storing a plurality of numerical values corresponding to said addresses, and for providing a selected numerical value in dependence upon said incrementally changed selected address; and
pulse generating means, operatively connected to said arithmetic means, for generating output pulses of a frequency which is proportional to said selected numerical value provided by said arithmetic means, the frequency of said output pulses corresponding to the feed speed.

18. A feed speed control system as set forth in claim 17, wherein said pulse generating means comprises:
means for providing clock pulses;
a register, connected to said arithmetic means, for receiving said selected numerical value;
an accumulator; and
an adder, operatively connected to said means for providing clock pulses, said register and said accumulator, for adding the contents of said register and said accumulator when one of the clock pulses is received, and for placing the result of the addition operation in said accumulator;
said accumulator providing said output pulses in the form of an overflow output.

19. A feed speed control system as set forth in claim 17 or 18, wherein said arithmetic means comprises:
an output register, connected to said memory means, for receiving the selected address;
an arithmetic circuit, connected to said output register and said manual operation means, for incrementally changing the content of said output register in dependence upon the adjustment pulse from said manual operation means, and for providing, as an output, said incrementally changed selected address; and
a conversion memory, operatively connected to said arithmetic circuit and to said pulse generating means, for storing said numerical values corresponding to said addresses and for providing said selected numerical value to said pulse generating means in dependence upon the incrementally changed selected address provided by said arithmetic circuit.

* * * * *

UNITED STATES PATENT AND TRADEMARK OFFICE
CERTIFICATE OF CORRECTION

PATENT NO. : 4,370,704
DATED : JANUARY 25, 1983
INVENTOR(S) : HIROOMI FUKUYAMA ET AL.

It is certified that error appears in the above-identified patent and that said Letters Patent is hereby corrected as shown below:

Front page, [75] Inventors, delete "Hachioji"; "Tachikawa, both of" should be --both of Tokyo,--.

Front page, [56] References Cited, "Hamill et al." should be --Hamill, III et al.--.

Col. 2, line 12, "prior art block diagram of a" should be --block diagram of a prior art--.
Col. 6, line 13, "bult-in" should be --built-in--.
Col. 7, line 20, "a register" should begin a new paragraph;
Col. 7, line 21, "an accumulator" should begin a new paragraph;
Col. 7, line 29, "pulses" should be --pulse--.
Col. 8, line 31, "pulses" should be --pulse--.

Signed and Sealed this

Twenty-sixth Day of July 1983.

[SEAL]

Attest:

GERALD J. MOSSINGHOFF

Attesting Officer

Commissioner of Patents and Trademarks